United States Patent [19]

Baker et al.

[11] 4,105,834

[45] Aug. 8, 1978

[54] ELECTRIC CELLS

[76] Inventors: Derrick John Baker; Roger John Bones, both c/o United Kingdom Atomic Energy Authority, 11 Charles II St., London, England, S.W.1

[21] Appl. No.: 839,021

[22] Filed: Oct. 3, 1977

[30] Foreign Application Priority Data

Oct. 14, 1976 [GB] United Kingdom ............... 42811/76

[51] Int. Cl.² .......................................... H01M 10/39
[52] U.S. Cl. ..................................... 429/104; 429/185
[58] Field of Search ................ 429/104, 163, 31, 185, 429/171, 174, 191, 193, 101, 102

[56] References Cited

U.S. PATENT DOCUMENTS

| | | | |
|---|---|---|---|
| 3,770,502 | 11/1973 | Nakabayashi | 429/104 |
| 4,048,391 | 9/1977 | Tilley et al. | 429/104 |
| 4,048,393 | 7/1977 | Heintz et al. | 429/104 |

*Primary Examiner*—Anthony Skapars
*Attorney, Agent, or Firm*—Larson, Taylor and Hinds

[57] ABSTRACT

The invention provides an electric cell having a compartment containing liquid anode, a compartment containing liquid cathode, a solid electrolyte which partially bounds each of the compartments, a ceramic support member which supports the solid electrolyte, and metallic closure members closing the compartments. The closure member closing the liquid anode compartment is joined to the support member by a brazed joint resistant to the liquid anode, and the closure member closing the liquid cathode compartment is joined to the support member or the solid electrolyte by a glass seal.

8 Claims, 3 Drawing Figures

ELECTRIC CELLS

BACKGROUND TO THE INVENTION

This invention relates to electric cells of the kind for use with a liquid anode, a liquid cathode, a solid electrolyte, and a current collecting means and is more particularly concerned with the sealing of such cells.

SUMMARY OF THE INVENTION

According to the present invention, in an electric cell for use with a liquid anode and a liquid cathode and having a ceramic solid electrolyte member which defines at least in part on one side thereof a compartment for the liquid anode and on the other side thereof a compartment for the liquid cathode, there are provided a ceramic support member joined by a glass seal to the solid electrolyte member so as to support the solid electrolyte member, and metallic closure members electrically insulated from each other for closing the compartments, the metallic closure member for closing the anode compartment being joined to the ceramic support member by a brazed joint which is resistant to the anode material, and the metallic closure member for closing the cathode compartment being joined to either the solid electrolyte member or the ceramic support member by a glass seal.

Preferably, the metallic closure members comprise low expansion alloy, such as "Nilo K," or "Nilo 42."

In a cell having sodium as the liquid anode, and sulphur as the liquid cathode, the braze material desirably comprises Johnson Matthey 'B' Bronze Braze having a composition of 97% Cu, 2.95% Ni, 0.05% B and the glass seal comprises barium alumino-borate glass, or Kodial glass.

The braze material may be protected by a coating of a liquid anode resistant material such as aluminium to provide the liquid anode resistant brazed joint.

BRIEF EXPLANATION OF THE DRAWINGS

To enable the present invention to be more readily understood attention is directed by way of example only to the accompanying drawings, in which.

In the above Figures, like parts have like numerals.

DETAILED DESCRIPTION OF THE INVENTION

Figure 1:
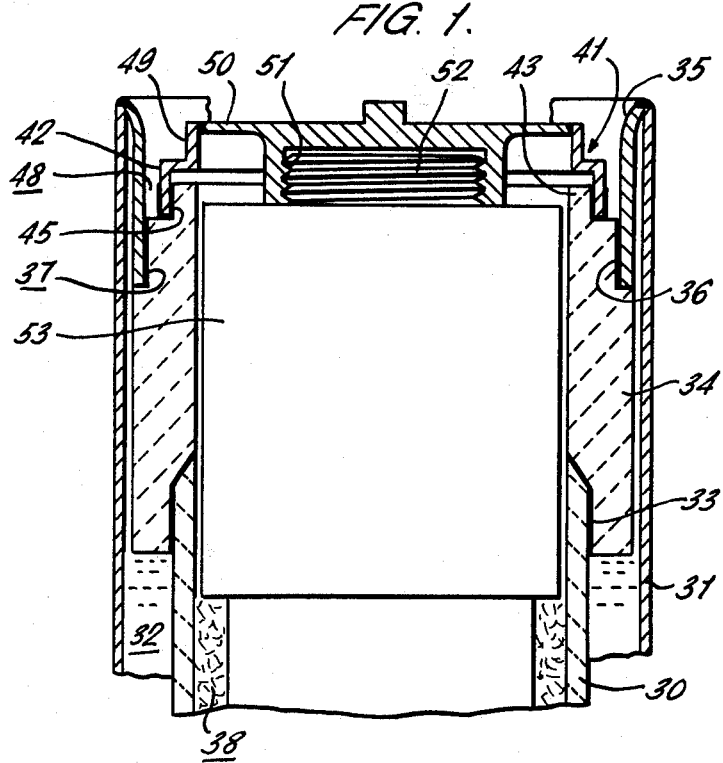
FIG. 1 represents diagrammatically a longitudinal section through one end of a sodium-sulphur electric cell of tubular form.

Referring now to FIG. 1, part of a beta-alumina solid electrolyte tube 30 is shown contained within a stainless steel tubular housing 31 to define therebetween a compartment 32 for liquid sodium and a compartment 38 inside the solid electrolyte 30 for sulphur. An alpha-alumina annular support member 34 is joined to the end of the solid electrolyte 30 by a glass seal 33, and has an outer diameter slightly smaller than the internal diameter of the housing 31 and an internal diameter which is substantially equal to that of the solid electrolyte 30 except where it is relieved for the part 30 to fit into it. An outer closure member in the form of a ring 35 of controlled expansion alloy, typically "Nilo K" or "Nilo 42" is secured by a braze 36 possessing some resistance to sodium attack, such as Johnson Matthey 'B' Bronze Braze 97% Cu, 2.95% Ni, 0.05% B), around a slightly reduced diameter portion 37 of the support member 34. The top of the ring 35 is flared to extend radially outwards to the end surface of the housing 31 where it is edge-welded thereto to close the sodium compartment 32, the ring 35 thereby providing a relatively flexible connection between the housing 31 and the support member 34.

The portion 37 is metallized prior to brazing, typical metallizing compositions being:

(a) Tungsten carbide — Manganese
(b) Molybdenum — Manganese
(c) Pure Molybdenum

Subsequently, a layer of nickel is usually applied to provide good wetting of the braze material. The nickel may be applied by electroplating to achieve a thickness of about 2–4 $\mu$m, or by applying a nickel oxide paint and reducing with hydrogen to produce a nickel layer of between 5–10 $\mu$m thick.

An annular element 41 made of the same controlled expansion alloy as the ring 35, is of stepped form. The larger cylindrical portion 42 of the annular element 41 fits around a spigot 43 located at the upper end of the support member 34 and of smaller diameter than the portion 37, and is secured thereto by a glass seal 45, such as barium alumino-borate or Kodial glass, a space 48 (e.g. of the order of "010" but shown exaggerated for clarity) being provided between the glass seal 45 and the ring 35 to avoid imposing any restraint on the movement of the ring 35. That portion of the annular element 41 to be secured by the glass seal 45 is oxidised, prior to glazing, for example, in an oxidising furnace at about 600° to 650° C. The smaller diameter portion 49 of the annular element 41 is welded to a shaped stainless steel cap member 50 to close the sulphur compartment 38, the cap member 50 having an internally threaded hole 51 in which is engaged a threaded spigot 52 of a current collector 53 of graphite, or of metal coated with graphite. For further details of sodium-sulphur cells reference may be made, for example, to U.S. Pat. No. 3,982,959 or co-pending U.K. patent application No. 10835/74 which are incorporated by reference herein.

The inside surface of the annular element 41 may be coated (not shown) with a material such as alpha-alumina or aluminium to protect it against the corrosive effect of sulphur vapour. The braze 36 may be provided for additional protection with a sodium corrosion resistant coating of a material such as aluminium applied for example, by vapour deposition.

It will be appreciated that the only metal to non-metal seal exposed to liquid sodium is that provided by the sodium resistant brazed joint. In much the same way, the glass seals 33 and 45, which are sulphur resistant, are the only seals exposed to the corrosive effect of sulphur vapour. The glass seal 45 also provides electrical insulation between the annular element 41, and the braze 36 and ring 35. During the brazing of the ring 35 to the support member 34, care should be taken to prevent braze 36 from spreading on to the spigot 43 to avoid any likelihood of the ring 35 and annular element 41 being electrically connected together.

As an alternative to the use of a controlled expansion alloy, the ring 35 may be made from other suitable metals, such as stainless steel, but attention must be paid in the design of the joint to the load imposed on the brazed joint from the greater co-efficient of expansion of such metals than that of the support member 34.

Figure 2:
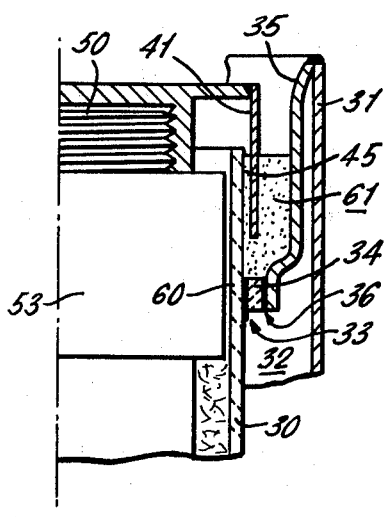
FIG. 2 represents diagrammatically in fragmentary median half-section, a modification of the cell shown in FIG. 1.
Figure 3:
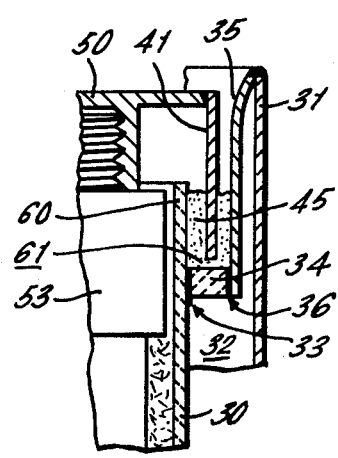
FIG. 3 represents diagrammatically in fragmentary median half-section, a modification of the cell shown in FIG. 2.

The invention has so far been described in relation to the metallic closure members being sealingly joined to a shaped ceramic support member, but the metallic closure member closing the liquid sulphur compartment may be sealingly joined by a glass seal to the solid electrolyte member as shown, for example, in fragmentary median half-section in FIGS. 2 and 3 so that a simple relatively small ceramic support member may be used.

Referring now to FIG. 2, the annular alpha-alumina support member 34 is now of rectangular shape in cross-section, and is joined by a glass seal 33 to the solid electrolyte 30 in such manner as to leave a spigot portion 60 of the solid electrolyte 30. The ring 35 forming the outer metallic closure member is stepped radially inwards at its lower end to locate around the support member 34, to which it is brazed by brazing means 36, and provides a cavity 61 for the glass seal 45 therebetween the spigot portion 60. The annular element 41 clips into and is held by the glass seal 45 in the cavity 61, thereby providing a sealed joint between the annular element 41 and the solid electrolyte 30. In other respects the arrangement shown in FIG. 2 is similar to the arrangement shown in FIG. 1 and uses the same materials.

The other arrangement shown in FIG. 3 is similar to that shown in FIG. 2, but the annular element 41 is of greater external diameter so that a ring 35 similar in shape to that shown in FIG. 1 may be used.

The glass seals 33 and 45 may conveniently be made at the same time being formed as integral parts of a single glass seal, the sides of the solid electrolyte 30, ring 35, and support member 34 defining a cavity to hold the powdered glass prior to fusing.

The invention has been shown in the Figures as being incorporated in a cell in which a sodium compartment 32 encompasses a solid electrolyte 30 containing a sulphur compartment 38, but the invention may be incorporated in a reverse arrangement in which the outer compartment 32 contains sulphur and encompasses an inner compartment 38 containing sodium. In such a reverse arrangement, the ring 35 would be joined to the support member 34 by a glass seal 45 and made from a controlled expansion alloy to match the limited expansion of the glass seal 45, and the annular element 41 which may now be of stainless steel, would be joined to the support member 34 by braze 36.

The invention may also be incorporated in cells of non-tubular form, for example of flat form.

Alternative metal brazes may be used, for example, an active metal braze such as Zr/Ni which would not require the support member 34 to be metallized but would require it to be made from a high purity alpha-alumina.

It might be possible to braze the ring 35 directly to the solid electrolyte 30 so that the alpha-alumina support member 34 could be dispensed with.

We claim:

1. An electric cell having an anode, a liquid cathode, and a ceramic solid electrolyte member which defines at least in part on one side thereof a compartment for the liquid anode and on the other side thereof a compartment for the liquid cathode, wherein the improvement comprises,
    (a) a ceramic support member joined by a glass seal to the solid electrolyte member so as to support the solid electrolyte member,
    (b) a first metallic closure member closing the anode compartment and joined to the ceramic support member by a brazed joint which is resistant to the anode material, and
    (c) a second metallic closure member closing the cathode compartment and joined by a glass seal to either the ceramic support member or to the solid electrolyte member, the first and second metallic closure members being electrically insulated from each other.

2. A cell as claimed in claim 1, wherein the first and second metallic closure members comprise low expansion alloy.

3. A cell as claimed in claim 1, wherein the brazed joint includes a coating of liquid anode resistant material at that portion of the brazed joint exposed to the liquid anode.

4. A cell as claimed in claim 3, wherein the liquid anode comprises liquid sodium, and the coating comprises aluminium.

5. A cell as claimed in claim 1, wherein a coating of liquid cathode resistant material is provided on that portion of the second metallic closure member which bounds the liquid cathode compartment.

6. A cell as claimed in claim 5 wherein the liquid cathode comprises liquid sulphur, and the coating comprises alpha-alumina, or aluminium.

7. A cell as claimed in claim 1, wherein the solid electrolyte member is of tubular form having an open end, and the ceramic support member is of annular form and is joined at the inner periphery thereof to the outer periphery of the solid electrolyte member near the open end of the solid electrolyte member.

8. An electric cell having liquid sodium as the liquid anode, liquid sulphur as the liquid cathode, a solid electrolyte member comprising beta-alumina and of tubular form having an open end and a closed end, and a metal tubular housing disposed about the solid electrolyte member to define a compartment for the liquid sodium therebetween, a compartment for the liquid sulphur being provided inside the solid electrolyte member, wherein the improvement comprises,
    (a) a ceramic support member of substantially flat annular form and joined by a glass seal at the inner periphery thereof to the outer periphery of the solid electrolyte member near the open end of the solid electrolyte member,
    (b) a first metallic closure member generally of tubular form with a flared end and of low expansion alloy, and welded at the flared end to the housing and joined at the other end at the inner periphery thereof to the outer periphery of the ceramic support member by a brazed joint which is resistant to liquid sodium thereby to define a cavity between the solid electrolyte member, the brazed joint including a coating of aluminium on that portion of said brazed joint exposed to the liquid sodium,
    (c) a glass seal contained in the cavity and joined to the solid electrolyte member, and
    (d) a second metallic closure member having a tubular portion of low expansion alloy which extends into the cavity and is joined by the glass seal therein to the solid electrolyte member and electrically insulated by said glass seal from the first metallic closure member, said tubular portion extending from and being welded to a metal end cap portion of the second metallic closure member which closes the sulphur compartment and provides an internally threaded location for a current collector in the sulphur compartment, the second metallic closure member being coated with aluminium on that portion thereof exposed to the liquid sulphur.

* * * * *